United States Patent
Holstine et al.

(10) Patent No.: US 11,345,458 B2
(45) Date of Patent: *May 31, 2022

(54) DEPLOYABLE OVERHEAD PROTECTION ASSEMBLY AND METHODS OF USE FOR CANOPY FRAGILIZATION SYSTEM

(71) Applicant: AMI INDUSTRIES, INC., Colorado Springs, CO (US)

(72) Inventors: Steven A Holstine, Colorado Springs, CO (US); Nathan Eischeid, Cedar Rapids, IA (US); Bradley Mastrolia, Colorado Springs, CO (US); John Hampton, Colorado Springs, CO (US); Neil Cross, Peyton, CO (US); Kassidy L. Carson, Colorado Springs, CO (US); Ian Walter Haas, Colorado Springs, CO (US); Patrick Emmett Hyde, Colorado Springs, CO (US); Aaron H. Keene, Colorado Springs, CO (US); Cyle Teal, Colorado Springs, CO (US); John Wade, Colorado Springs, CO (US)

(73) Assignee: AMI Industries, INC., Colorado Springs, CO (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/938,780

(22) Filed: Jul. 24, 2020

(65) Prior Publication Data
US 2022/0024554 A1  Jan. 27, 2022

(51) Int. Cl.
*B64D 25/10* (2006.01)
*B64C 1/32* (2006.01)

(52) U.S. Cl.
CPC .............. *B64C 1/32* (2013.01); *B64D 25/10* (2013.01)

(58) Field of Classification Search
CPC .................................. B64C 1/32; B64D 25/10
See application file for complete search history.

(56) References Cited

U.S. PATENT DOCUMENTS

| | | |
|---|---|---|
| 3,721,407 A | 3/1973 | Clarke |
| 3,880,387 A | 4/1975 | Martin, Jr. |
| 5,301,904 A | 4/1994 | Guill |
| 5,954,296 A | 9/1999 | Jahsman et al. |
| 6,315,245 B1 * | 11/2001 | Ruff ................... B64D 25/02 244/122 AG |
| 6,752,355 B1 | 6/2004 | Wood |
| 8,191,830 B2 * | 6/2012 | Mastrolia ............... B64D 25/10 244/122 AG |
| 10,384,788 B2 | 8/2019 | Campbell et al. |
| 10,486,643 B1 | 11/2019 | Raybon |

FOREIGN PATENT DOCUMENTS

GB 888751 2/1962

\* cited by examiner

*Primary Examiner* — Richard G Davis
(74) *Attorney, Agent, or Firm* — Snell & Wilmer L.L.P.

(57) ABSTRACT

A canopy fragilization system for use in an aircraft ejection system may comprise: a sharp breaker disposed on a first side of an ejection seat, the sharp breaker configured to act as a primary breaker of a canopy of an aircraft; a blunt breaker disposed on a second side of the ejection seat, the blunt breaker configured to act as a secondary breaker of the canopy of the aircraft; and a deployable overhead protection assembly comprising a first tertiary breaker and a second tertiary breaker.

19 Claims, 6 Drawing Sheets

DEPLOYABLE OVERHEAD PROTECTION ASSEMBLY AND METHODS OF USE FOR CANOPY FRAGILIZATION SYSTEM

FIELD

The present disclosure relates to escape systems, and more specifically, to deployable overhead protection assemblies for ejection systems.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. During a backup mode ejection, where a transparency/canopy is not previously fragilized, load transfer may potentially be transferred from the canopy to an occupant's head if the transparency does not sufficiently break.

SUMMARY

A deployable overhead protection assembly is disclosed herein. The deployable overhead protection assembly may comprise: a base configured to pivotably couple to a headrest of an ejection seat; a first stabilizer extending from a first side of the base, the first stabilizer having a first breaker disposed distal from the base; a second stabilizer extending from a second side of the base, the second side opposite the first side, the second stabilizer including a second breaker disposed distal to the base; and a mitt coupled to the base and disposed laterally between the first stabilizer and the second stabilizer.

In various embodiments, the first breaker and the second breaker are configured to propagate cracks in a canopy of an aircraft forward during an ejection event. The first stabilizer may comprise a stabilizing portion and a breaker portion. The stabilizing portion may be configured to stabilize a head of an occupant during an ejection of the occupant. The breaker portion may include the first breaker and configured to impact a canopy of an aircraft during an ejection event. The first breaker and the second breaker may be blunt breakers. The first stabilizer and the second stabilizer may extend vertically above the mitt when in a deployed position. The deployable overhead protection assembly may further comprise a first cable configured to extend from the first breaker to a sharp breaker of a canopy fragilization system, and a second cable configured to extend from the second breaker to a blunt breaker of the canopy fragilization system.

A canopy fragilization system for use in an aircraft ejection system is disclosed herein. The canopy fragilization system may comprise: a sharp breaker disposed on a first side of an ejection seat, the sharp breaker configured to act as a primary breaker of a canopy of an aircraft; a blunt breaker disposed on a second side of the ejection seat, the blunt breaker configured to act as a secondary breaker of the canopy of the aircraft; and a deployable overhead protection assembly comprising a first tertiary breaker and a second tertiary breaker.

In various embodiments, the first tertiary breaker is disposed on a first stabilizer of the deployable overhead protection assembly, and the second tertiary breaker is disposed on a second stabilizer of the deployable overhead protection assembly. The first tertiary breaker and the second tertiary breaker may be disposed forward of the sharp breaker and the blunt breaker. The deployable overhead protection assembly may further comprise a first cable extending from the first tertiary breaker and a second cable extending from the second tertiary breaker to the blunt breaker. The canopy fragilization system may further comprise the canopy of an aircraft, wherein the first cable and the second cable are configured to saw through the canopy of the aircraft. The deployable overhead protection assembly may further comprise a base, a first stabilizer extending from a first side of the base and a second stabilizer extending from a second side of the base, a mitt coupled to the base and disposed laterally between the first stabilizer and the second stabilizer. The first stabilizer and the second stabilizer may extend vertically above the mitt when in a deployed position. The first tertiary breaker and the second tertiary breaker may be configured to propagate cracks in the canopy of the aircraft forward during an ejection event.

A method for fragilizing a canopy of an aircraft during an ejection event is disclosed herein. The method may comprise: exerting a first impulse on the canopy of an aircraft with a sharp breaker; exerting a second impulse on the canopy of the aircraft with a blunt breaker; exerting a third impulse on the canopy with a first tertiary breaker disposed forward of the sharp breaker and the blunt breaker; and exerting a fourth impulse on the canopy with a second tertiary breaker disposed forward of the sharp breaker and the blunt breaker.

In various embodiments, the first tertiary breaker is disposed on a first stabilizer of a deployable overhead protection assembly, and the second tertiary breaker is disposed on a second stabilizer of the deployable overhead protection assembly. The method may further comprise sawing through the canopy with a first cable and a second cable. The first cable may extend from the first tertiary breaker to the sharp breaker and the second cable extends from the second tertiary breaker to the blunt breaker. A first crack generated from the sharp breaker and a second crack generated from the blunt breaker may propagate forward on the canopy in response to contacting the canopy with the first tertiary breaker and the second tertiary breaker. The method may further comprise pushing the canopy with the blunt breaker.

The foregoing features and elements may be combined in various combinations without exclusivity, unless expressly indicated otherwise. These features and elements as well as the operation thereof will become more apparent in light of the following description and the accompanying drawings. It should be understood; however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
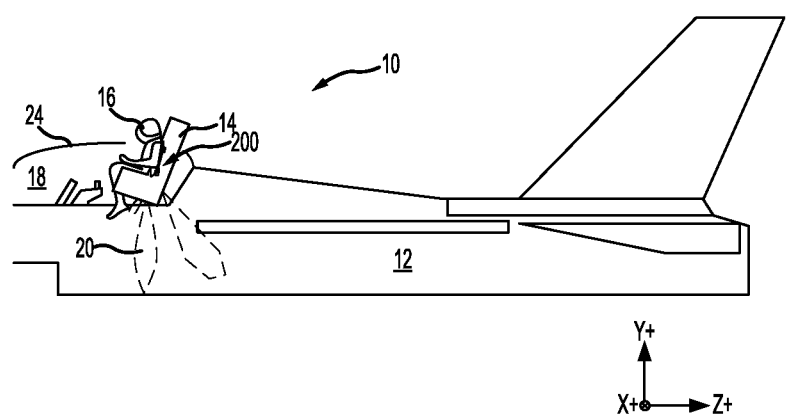
FIG. 1 illustrates an aircraft ejection system, in accordance with various embodiments.

With reference to FIG. 1, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. The aircraft ejection system may further comprise an element of propulsion system 20 and be configured to extract the ejection seat 14 from cockpit 18. In accordance with various embodiments, ejection seat 14 includes canopy fragilization system 200. The canopy fragilization system 200 may be configured to break a canopy 24 of the aircraft 12 in response to ejection seat 14 being propelled vertically from the aircraft 12. For example, the ejection seat 14 may include a deployable overhead protection assembly configured to propagate a crack in the canopy 24 forward in the canopy 24, start the crack propagation prior to an occupant's head reaching the canopy 24, and/or transfer a contact load to the ejection seat 14. In this regard, the canopy fragilization system 200 may be configured to safely eject an occupant during a pilot ejection event.

Figures 2A, 2B:
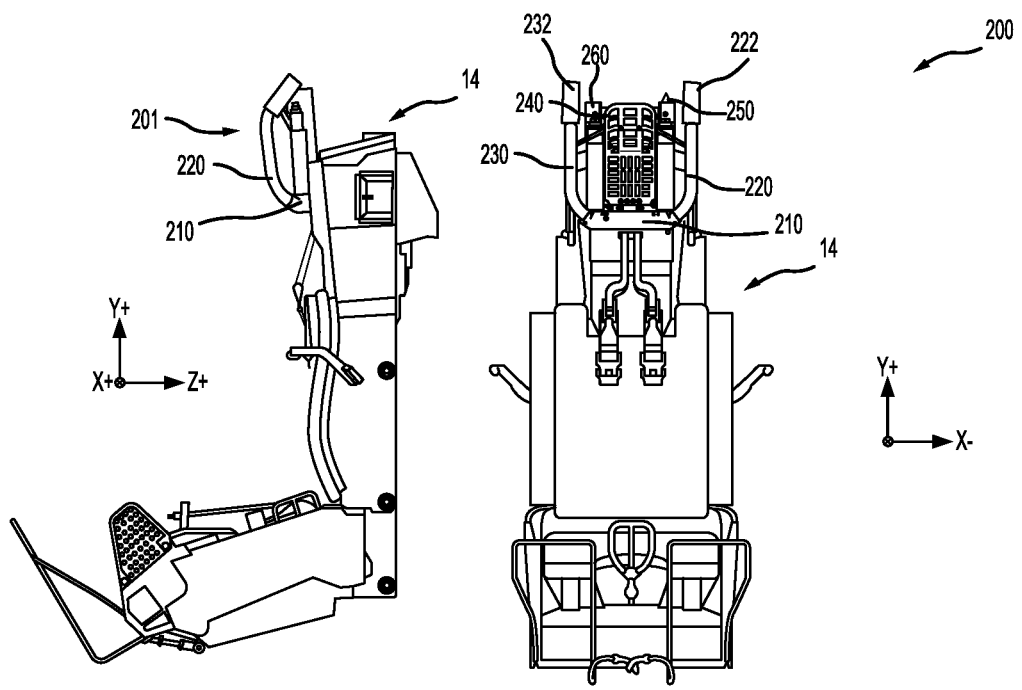
FIG. 2A illustrates a side view of an ejection seat, in accordance with various embodiments.
FIG. 2B illustrates a front view of an ejection seat, in accordance with various embodiments.

Referring now to FIGS. 2A and 2B, a side view (FIG. 2A) and a front view (FIG. 2B) of an ejection seat having a deployable overhead protection assembly 201 in a stowed position for use in an aircraft ejection system, is illustrated, in accordance with various embodiments. In various embodiments, an ejection seat 14 for use in an aircraft ejection system 10 from FIG. 1, comprises a canopy fragilization system 200. In various embodiments, the canopy fragilization system 200 may include a deployable overhead protection assembly 201, a primary breaker 250, and a secondary breaker 260. In various embodiments, the deployable overhead protection assembly 201 includes a base 210, a first stabilizer 220, a second stabilizer 230, and mitt 240.

In various embodiments, the base 210 is rotatably coupled to a headrest 110 of ejection seat 14. The mitt 240, the first stabilizer 220, and the second stabilizer 230 are coupled to the base 210. The mitt 240 extends outward from a center portion of base 210, the first stabilizer 220 extends outward from a first side of the base 210, and the second stabilizer 230 extends outward from a second side of the base 210. When the deployable overhead protection assembly 201 is in a stowed position, the first stabilizer 220 and the second stabilizer 230 may extend forward and vertically from the base 210. "Forward" as defined herein, is in the negative z-direction (e.g., towards a front end of aircraft 12 from FIG. 1). "Vertically," as defined herein refers to the positive Y-direction. "Laterally," as defined herein refers to the X-axis. In various embodiments, the first stabilizer 220 and the second stabilizer 230 may prevent rotation of an occupant's head during an ejection event (e.g., the first stabilizer 220 and the second stabilizer 230 are configured to stabilize an occupant's head during ejection).

In various embodiments, the mitt 240 is disposed laterally between the first stabilizer 220 and the second stabilizer 230. The mitt 240 may comprise aluminum, steel, titanium, a carbon composite, or any other high strength material. In various embodiments, the mitt 240 may comprise a grid pattern, or the like. The grid pattern may produce a lower weight of the mitt 240 relative to a solid mitt, which is also within the scope of this disclosure. In various embodiments, any pattern for the mitt 240 is within the scope of this disclosure. In various embodiments, when deployed, the first stabilizer 220 may be disposed on a first side of an occupant's head and the second stabilizer 230 may be disposed on a second side of the occupant's head. In this regard, the first stabilizer 220 and the second stabilizer 230 may be configured to stabilize an occupant's head during a backup ejection mode. A "backup ejection mode," as described herein, is an ejection mode where the canopy 24 from FIG. 1 is not fragilized prior to ejection. Stated another way, a "backup ejection mode" may utilize the canopy fragilization system 200 of ejection seat 14 to fragilize the canopy 24 from FIG. 1 to eject an occupant.

In various embodiments, in a stowed position, the mitt 240 may extend vertically and forward from the base 210. Similarly, in various embodiments, the first stabilizer 220 and the second stabilizer 230 may extend vertically and forward from the base 210 when in the stowed position. In various embodiments, the first stabilizer 220 and the second stabilizer 230 may be configured to contribute to the fragilization of the canopy 24 from FIG. 1, as described further herein. For example, the canopy fragilization system 200 may comprise a primary breaker 250, a secondary breaker 260, a first tertiary breaker 222 of the first stabilizer 220 and a second tertiary breaker 232 of the second stabilizer 230. In this regard, the primary breaker 250, the secondary breaker 260, the first tertiary breaker 222 and the second tertiary breaker 232 may each contribute to a fragilization of the canopy 24 from FIG. 1 during a backup ejection mode, as described further herein. In various embodiments, the primary breaker 250 may comprise a sharp breaker and the secondary breaker 260 may comprise a blunt breaker. A "sharp breaker," as defined herein, is breaker configured to generate a greater pressure on the canopy relative to the "blunt breaker." (e.g., an area of impact of a sharp breaker may be less than an area of impact of the blunt breaker. For example, a sharp breaker may exert a pressure between 2 and 20 times a blunt breaker, in accordance with various embodiments.

In various embodiments, the first tertiary breaker 222 and the second tertiary breaker 232 may be any shape and sized and configured for crack propagation. For example, the first tertiary breaker 222 and the second tertiary breaker 232 may comprise a blunt breaker, a sharp breaker, a conical breaker, a cylindrical breaker, a head with pointed edges in the shape of a cross, or the like.

Figure 3:
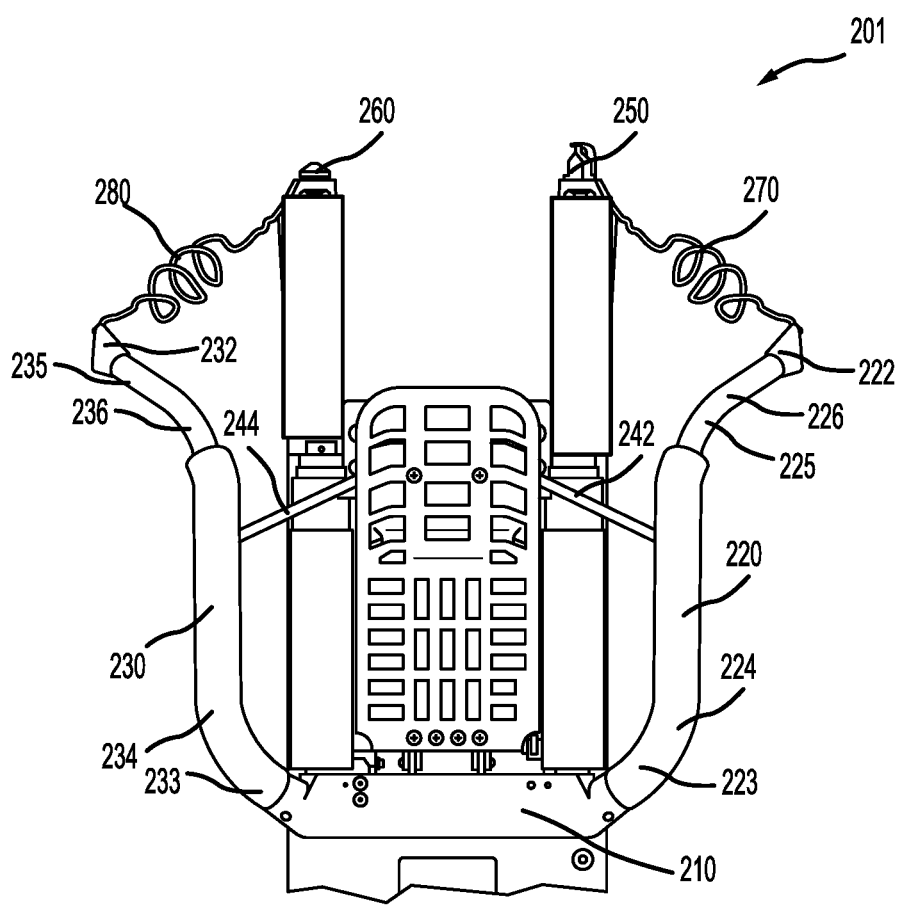
FIG. 3 illustrates detail view of a deployable overhead protection assembly, in accordance with various embodiments.

Referring now to FIG. 3, a detail front view of the deployable overhead protection assembly in a stowed position for use in an aircraft ejection system, is illustrated, in accordance with various embodiments. In various embodiments, the first stabilizer 220 may comprise a stabilizing portion 224 and a breaker portion 226. The stabilizing portion 224 may extend from the base 210 in a vertical direction when the deployable overhead protection assembly 201 is in a stowed position. The stabilizing portion 224 may be configured to stabilize a head of an occupant during an ejection event. The breaker portion 226 may be configured to contribute to crack propagation of a canopy (e.g., canopy 24 from FIG. 1) during a backup ejection mode. In various embodiments, the first stabilizer 220 may include a tube portion 225 extending from the base to the first tertiary breaker 222. The tube portion may be metallic or a composite material. In various embodiments, the stabilizing portion 224 may include a coating 223 configured to grip a helmet of an occupant during an ejection event or the like. In various embodiments, the coating may extend the entire length of the first stabilizer 220 or only along the stabilizing portion 224 of the first stabilizer 220.

In various embodiments, the second stabilizer 230 may be complimentary to the first stabilizer 220 about the base 210. For example, the second stabilizer 230 may also comprise a stabilizing portion 234, a breaker portion 236, a coating 223, and a tube portion 235. In various embodiments, the deployable overhead protection assembly 201 may further comprise a first cable 270 and a second cable 280. The first cable 270 may extend from the primary breaker 250 to the first tertiary breaker 222 of the first stabilizer, and the second cable 280 may extend from the secondary breaker 260 to the second tertiary breaker 232. In various embodiments, the first cable 270 and the second cable 280 may be a fabric chord, a braided steel cable, or the like. In various embodiments, the first cable 270 and the second cable 280 may become taut upon deployment. In this regard, the first cable 270 and the second cable 280 may act as a saw to further break a canopy (e.g., canopy 24 from FIG. 1) during a backup ejection event.

In various embodiments, the mitt 240 may be coupled to the first stabilizer 220 and the second stabilizer 230. For example, the deployable overhead protection assembly 201 may further comprise a first support rod 242 extending from the mitt 240 to the first stabilizer 220 and a second support rod 244 extending from the mitt 240 to the second stabilizer 230. In this regard, the support rods 242, 244 may further stabilize the deployable overhead protection assembly for use in an ejection event.

Figure 4:
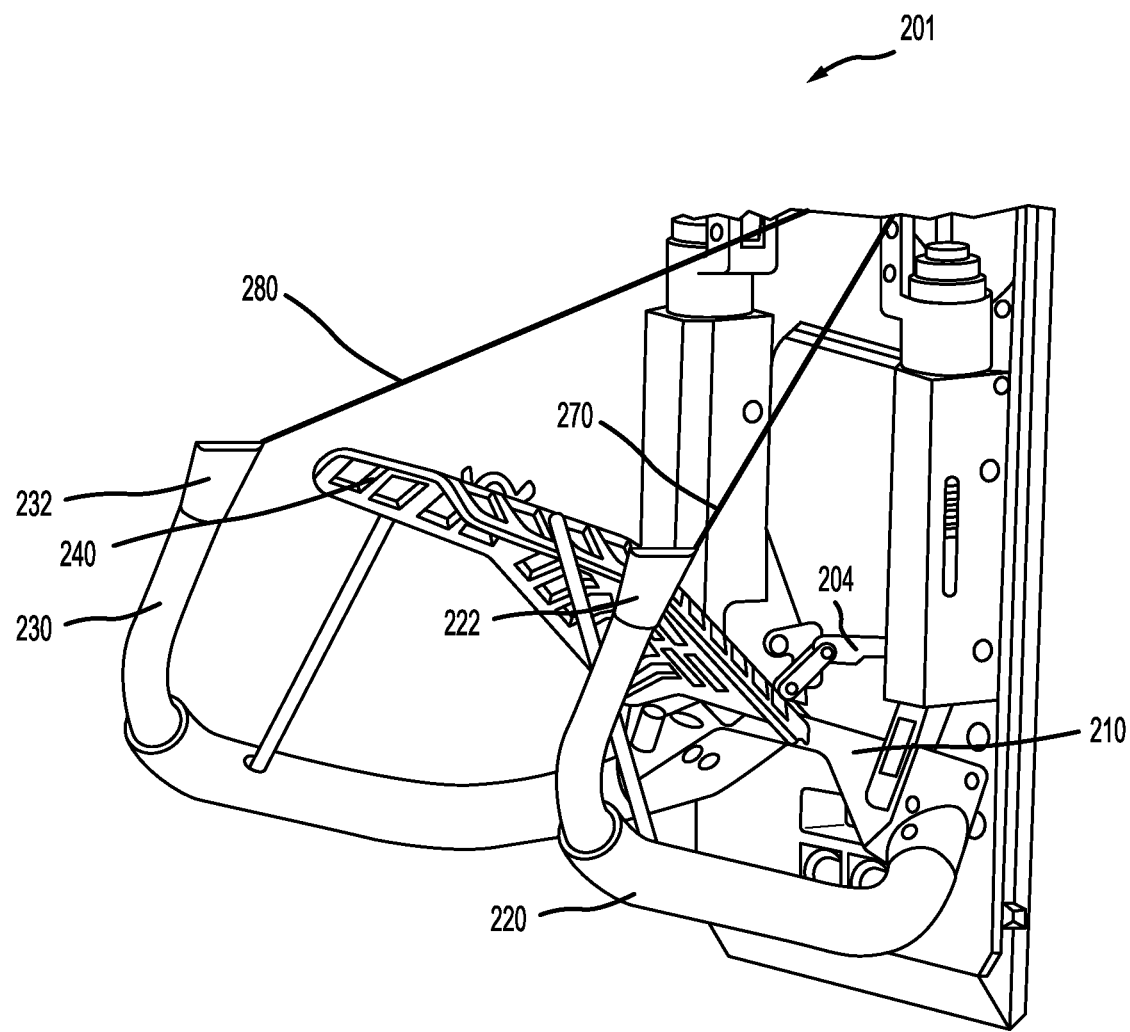
FIG. 4 illustrates a perspective view of a deployable overhead protection assembly, in accordance with various embodiments.

With reference now to FIG. 4, a portion of the deployable overhead protection assembly 201 in a deployed state is illustrated, in accordance with various embodiments. In various embodiments, when the deployable overhead protection assembly 201 is in the deployed state, the first cable 270 is taut and extends directly from the sharp breaker, or a support for the sharp breaker, to the first tertiary breaker 222. Similarly, the second cable 280 is taut and extends directly from the blunt breaker, or a support for the blunt breaker, to the second tertiary breaker 232. In various embodiments, the first cable 270 and/or the second cable 280 may act as a saw upon the canopy (e.g., canopy 24 from FIG. 1) upon ejection of the ejection seat (e.g., ejection seat 14 from FIGS. 1 and 2). For example, the first cable 270 and/or the second cable 280 may be serrated, or the like.

In various embodiments, the deployable overhead protection assembly 201 may be configured to pivot about the base 210 from the stowed position (e.g., FIGS. 2A and 2B) to the deployed position (e.g., FIG. 3) in response to an ejection initiation by a pilot. For example, in accordance with various embodiments, the deployable overhead protection assembly 201 may further comprise a pivot mechanism 204. The pivot mechanism 204 may be configured to pivot the deployable overhead protection assembly 201 about the base 210 from the deployed position to the stowed position by any method known in the art.

In various embodiments, in the deployed position, the first stabilizer 220 may extend vertically above the mitt 240. Similarly, in a deployed position, the second stabilizer 230 may extend vertically above the mitt 240. In this regard, by extending the first stabilizer 220 and the second stabilizer 230 vertically above the mitt 240, the first tertiary breaker 222 and the second tertiary breaker 232 may contact the canopy of the aircraft prior to an occupant, thus providing greater protection to the occupant, in accordance with various embodiments.

Figure 5:
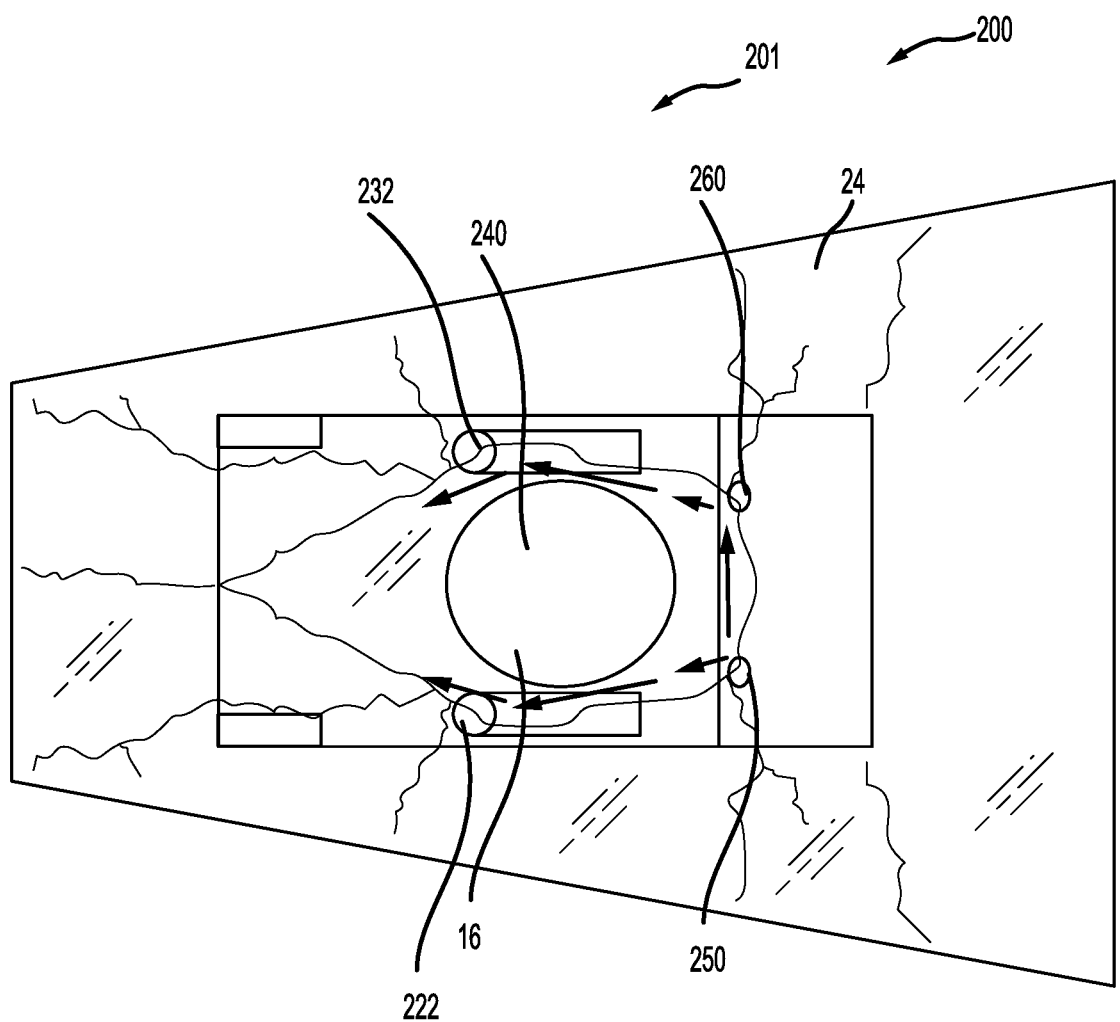
FIG. 5 illustrates a top view of a canopy fragilization system during use, in accordance with various embodiments.

With reference now to FIG. 5, a top down view of an aircraft during a backup ejection event, is illustrated, in accordance with various embodiments. Although illustrated as including a specific sequencing of impact points on canopy 24, any order of sequencing and directionality of impact locations and directionality of crack propagation is within this disclosure. For example, in accordance with various embodiments, impact locations and desired crack propagation may be determined by factors such as: (1) tolerance range of canopy material properties and geometry (e.g. thickness); (2) energy of impact range based on aircrew accommodation and seat performance factors; (3) tolerance range of canopy clearance to seat structure and occupant head/helmet at time of canopy impact accounting for aerodynamic and acceleration based deflections; and/or (4) other platform design, seat design, and aircrew population specifics.

In various embodiments, a first crack in the canopy 24 is configured to be produced by the primary breaker 250 as illustrated. In this regard, the primary breaker 250 may act as a primary breaker for the canopy fragilization system 200. Next, the secondary breaker 260 is configured to create a second crack and/or propagate the first crack laterally from the first crack and forward from the second crack. In this regard, the secondary breaker 260 may act as a secondary breaker for the canopy fragilization system 200. In various embodiments, the secondary breaker 260 may further act to push the transparency out of the way during an ejection event. In various embodiments, first tertiary breaker 222 and the second tertiary breaker 232 may then create a third crack and a fourth crack and/or propagate the first crack and the second crack forward in the canopy 24. In this regard, the tertiary breakers 222, 232 may act as tertiary breakers and/or an additional pusher for the canopy fragilization system 200. Although described as occurring in succession, in various embodiments, the impact of each breaker may occur simultaneously, or near simultaneously.

In various embodiments, the canopy fragilization system 200 is configured to break a propagate cracks around a perimeter of an occupant 16 to provide a window for the occupant to be ejected through. As such, in various embodiments, since the tertiary breakers 222, 232 contact the canopy 24 prior to a head of the occupant 16 the crack propagation may be initiated prior to the head of the occupant 16 reaching the canopy 24, resulting in lower loads experienced by the occupant 16.

Figure 6:
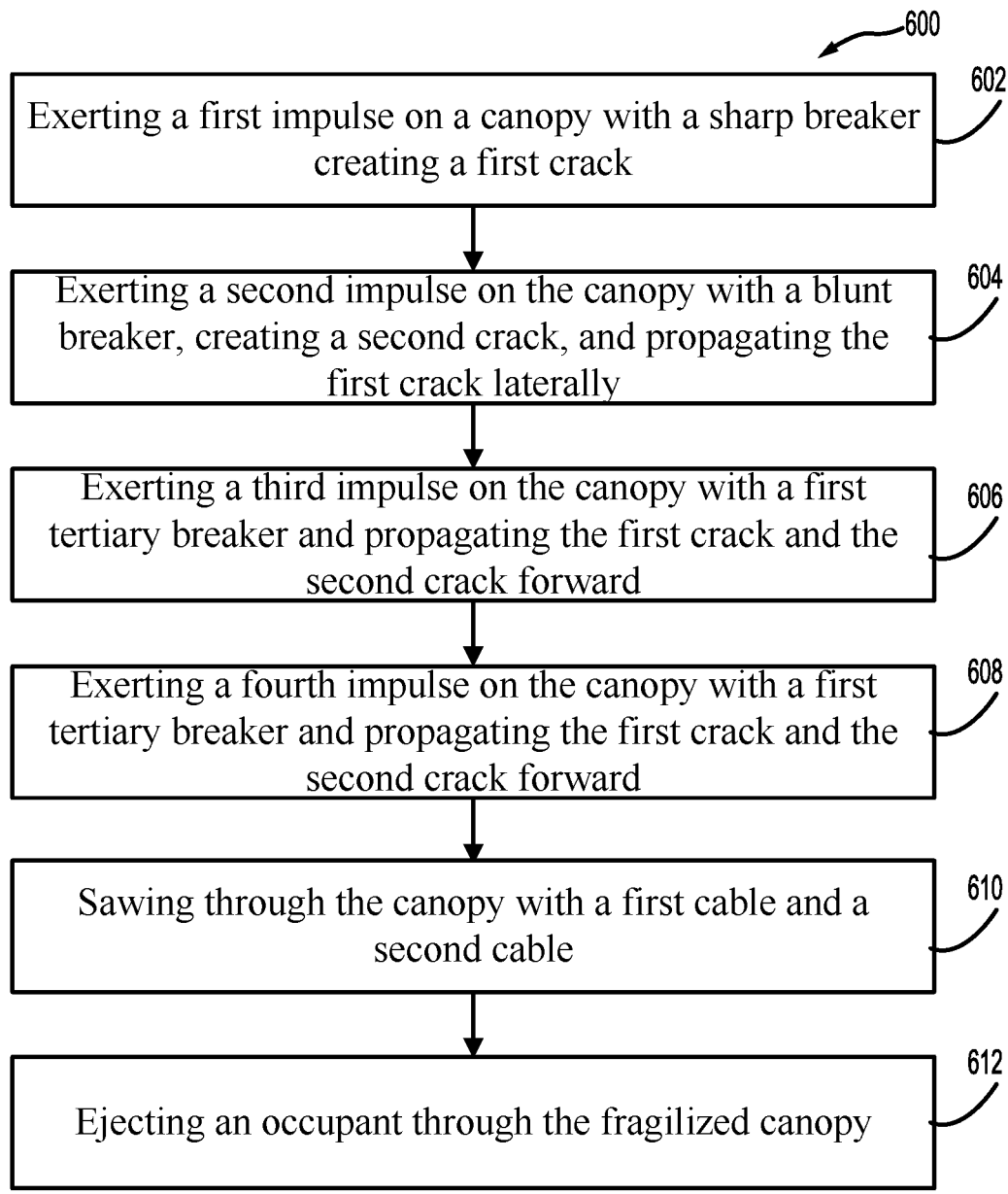
FIG. 6 illustrates a method of fragilizing a canopy, in accordance with various embodiments.

Referring now to FIG. 6, a method of using a canopy fragilization system for an aircraft during a backup mode ejection is illustrated, in accordance with various embodiments. The method 600 may exerting a first impulse on a canopy with a sharp breaker and creating a first crack in the canopy (step 602). The sharp breaker may be disposed on a first side of an ejection seat (e.g., a left hand side or a right hand side). The sharp breaker may make first contact with the transparency during the backup mode ejection. The sharp breaker may be in accordance with primary breaker 250 from FIGS. 2A-4.

The method 600 may further comprise exerting a second impulse on the canopy with a blunt breaker, creating a second crack, and propagating the first crack laterally (step 604). The blunt breaker may be disposed on a second side of the ejection seat opposite the first side. The blunt breaker may be in accordance with secondary breaker 260 from FIGS. 2A-4. In various embodiments, the first impulse may be greater than the second impulse.

The method 600 may further comprise exerting a third impulse on the canopy with a first tertiary breaker and propagating the first crack forward (step 606). The deployable overhead protection assembly may be in accordance with deployable overhead protection assembly 201. In various embodiments, the first tertiary breaker may be in accordance with first tertiary breaker 222 of the first stabilizer 220 from FIGS. 2A-4.

The method 600 may further comprise exerting a third impulse on the canopy with a second tertiary breaker and propagating the second crack forward (step 608). The deployable overhead protection assembly may be in accordance with deployable overhead protection assembly 201. In various embodiments, the second tertiary breaker may be in accordance with second tertiary breaker 232 of the first stabilizer 220 from FIGS. 2A-4.

The method 600 may further comprise sawing through the canopy with a first cable and a second cable (step 610). In various embodiments, the first cable may be in accordance with first cable 270 and the second cable may be in accordance with second cable 280 from FIGS. 3 and 4.

The method 600 may further comprise ejecting an occupant through the fragilized canopy (step 612). The blunt breaker may be configured to push the canopy out of the way and eject the occupant through the fragilized canopy in accordance with various embodiments. In various embodiments, an impact load from contacting the canopy with the deployable overhead protection assembly may be transferred to the ejection seat, and/or the occupant may experience little to no impact load from the ejection.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A deployable overhead protection assembly, comprising:
   a base configured to pivotably couple to a headrest of an ejection seat;
   a first stabilizer extending from a first side of the base, the first stabilizer having a first breaker disposed distal from the base;
   a second stabilizer extending from a second side of the base, the second side opposite the first side, the second stabilizer including a second breaker disposed distal to the base; and
   a mitt coupled to the base and disposed laterally between the first stabilizer and the second stabilizer.

2. The deployable overhead protection assembly of claim 1, wherein the first breaker and the second breaker are configured to propagate cracks in a canopy of an aircraft forward during an ejection event.

3. The deployable overhead protection assembly of claim 1, wherein:
the first stabilizer comprises a stabilizing portion and a breaker portion,
the stabilizing portion configured to stabilize a head of an occupant during an ejection of the occupant, and
the breaker portion including the first breaker and configured to impact a canopy of an aircraft during an ejection event.

4. The deployable overhead protection assembly of claim 1, wherein the first breaker and the second breaker are blunt breakers.

5. The deployable overhead protection assembly of claim 1, wherein the first stabilizer and the second stabilizer extend vertically above the mitt when in a deployed position.

6. The deployable overhead protection assembly of claim 1, further comprising a first cable configured to extend from the first breaker to a sharp breaker of a canopy fragilization system, and a second cable configured to extend from the second breaker to a blunt breaker of the canopy fragilization system.

7. A canopy fragilization system for use in an aircraft ejection system, the canopy fragilization system comprising:
a sharp breaker disposed on a first side of an ejection seat, the sharp breaker configured to act as a primary breaker of a canopy of an aircraft;
a blunt breaker disposed on a second side of the ejection seat, the blunt breaker configured to act as a secondary breaker of the canopy of the aircraft; and
a deployable overhead protection assembly comprising a first tertiary breaker and a second tertiary breaker.

8. The canopy fragilization system of claim 7, wherein:
the first tertiary breaker is disposed on a first stabilizer of the deployable overhead protection assembly, and
the second tertiary breaker is disposed on a second stabilizer of the deployable overhead protection assembly.

9. The canopy fragilization system of claim 8, wherein the first tertiary breaker and the second tertiary breaker are disposed forward of the sharp breaker and the blunt breaker.

10. The canopy fragilization system of claim 8, wherein the deployable overhead protection assembly further comprises a first cable extending from the first tertiary breaker and a second cable extending from the second tertiary breaker to the blunt breaker.

11. The canopy fragilization system of claim 10, further comprising the canopy of an aircraft, wherein the first cable and the second cable are configured to saw through the canopy of the aircraft.

12. The canopy fragilization system of claim 7, wherein the deployable overhead protection assembly further comprises a base, a first stabilizer extending from a first side of the base and a second stabilizer extending from a second side of the base, a mitt coupled to the base and disposed laterally between the first stabilizer and the second stabilizer.

13. The canopy fragilization system of claim 12, wherein the first stabilizer and the second stabilizer extend vertically above the mitt when in a deployed position.

14. The canopy fragilization system of claim 7, wherein the first tertiary breaker and the second tertiary breaker are configured to propagate cracks in the canopy of the aircraft forward during an ejection event.

15. A method for fragilizing a canopy of an aircraft during an ejection event, the method comprising: exerting a first impulse on the canopy of an aircraft with a sharp breaker; exerting a second impulse on the canopy of the aircraft with a blunt breaker; exerting a third impulse on the canopy with a first tertiary breaker disposed forward of the sharp breaker and the blunt breaker; and exerting a fourth impulse on the canopy with a second tertiary breaker disposed forward of the sharp breaker and the blunt breaker, wherein: the first tertiary breaker is disposed on a first stabilizer of a deployable overhead protection assembly, and the second tertiary breaker is disposed on a second stabilizer of the PHNP assembly.

16. The method of claim 15, further comprising sawing through the canopy with a first cable and a second cable.

17. The method of claim 16, wherein the first cable extends from the first tertiary breaker to the sharp breaker and the second cable extends from the second tertiary breaker to the blunt breaker.

18. The method of claim 15, wherein a first crack generated from the sharp breaker and a second crack generated from the blunt breaker propagate forward on the canopy in response to contacting the canopy with the first tertiary breaker and the second tertiary breaker.

19. The method of claim 15, further comprise pushing the canopy with the blunt breaker.

* * * * *